US006271956B1

(12) United States Patent
Saxe et al.

(10) Patent No.: US 6,271,956 B1
(45) Date of Patent: Aug. 7, 2001

(54) METHOD AND MATERIALS FOR ENHANCING THE ADHESION OF SPD FILMS, AND LIGHT VALVES COMPRISING SAME

(75) Inventors: Robert L. Saxe, New York; Steven M. Slovak, N. Massapequa, both of NY (US)

(73) Assignee: Research Frontiers Incorporated, Woodbury, NY (US)

(*) Notice: Subject to any disclaimer, the term of this patent is extended or adjusted under 35 U.S.C. 154(b) by 0 days.

(21) Appl. No.: 09/517,565

(22) Filed: Mar. 2, 2000

(51) Int. Cl.⁷ ..................................................... G02B 26/00

(52) U.S. Cl. ............................................................ 359/296

(58) Field of Search ........................... 359/296; 428/40.1, 428/42.3; 383/116

(56) References Cited

U.S. PATENT DOCUMENTS

| | | | | |
|---|---|---|---|---|
| 3,896,991 | * | 7/1975 | Kozlowski et al. | 229/55 |
| 4,415,615 | * | 11/1983 | Esmay et al. | 428/40 |
| 5,803,086 | * | 9/1998 | Scholz et al. | 128/849 |
| 6,114,426 | * | 9/2000 | Burack et al. | 524/409 |
| 6,129,964 | * | 10/2000 | Seth | 428/40.1 |
| 6,149,750 | * | 11/2000 | Parish, Jr. et al. | 156/154 |
| 6,187,126 | * | 2/2001 | Rothrum et al. | 156/200 |

* cited by examiner

*Primary Examiner*—Ricky Mack
(74) *Attorney, Agent, or Firm*—Greenbereg Traurig, LLP

(57) ABSTRACT

An improved method for adhering an SPD film to a substrate of a light valve is disclosed. The method comprises the steps of coating either the film or the substrate or both the film and the substrate with an adhesive, placing the film and substrate into contact and adhering the film and the substrate. The improvement comprises the use of an adhesive which is inherently tacky at room temperature or which becomes tacky at an elevated temperature.

20 Claims, No Drawings

METHOD AND MATERIALS FOR ENHANCING THE ADHESION OF SPD FILMS, AND LIGHT VALVES COMPRISING SAME

FIELD OF INVENTION

The present invention relates to methods and materials useable with SPD films to improve the adhesion of the films to a variety of surfaces, especially substrates such as glass or plastic sheets coated with a transparent, electrically conductive coating.

BACKGROUND

Light valves have been known for over sixty years for modulation of light. As used herein, a light valve may be described as a cell formed of two walls that are spaced apart by a small distance, at least one wall being transparent, the walls having electrodes thereon usually in the form of transparent electrically conductive coatings. The cell contains a light-modulating element (sometimes herein referred to as an "activatable material"), which may be either a liquid suspension of particles or a plastic film in which droplets of a liquid suspension of particles are distributed.

The liquid suspension (sometimes herein referred to as "a liquid light valve suspension") comprises small particles suspended in a liquid suspending medium. In the absence of an applied electrical field, the particles in the liquid suspension assume random positions due to Brownian movement, and hence a beam of light passing into the cell is reflected, transmitted or absorbed, depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state. Light valves of the type described herein are also known as "suspended particle devices" or "SPDs".

Light valves have been proposed for use in numerous applications including e.g., alphanumeric displays and television displays; filters for lamps, cameras, optical fibers and for displays; and windows, sunroofs, sunvisors, eyeglasses, goggles and mirrors and the like to control the amount of light passing therethrough or reflected therefrom as the case may be. Examples of windows, without limitation, include architectural windows for commercial buildings, greenhouses and residences, windows for automotive vehicles, boats, trains, planes and spacecraft, windows for doors including peepholes, and windows for appliances such as ovens and refrigerators including compartments thereof.

For many applications, it is preferable for the activatable material, i.e. the light-modulating element, to be a plastic film rather than a liquid suspension. For example, in a light valve used as a variable light transmission window, a plastic film, in which droplets of liquid suspension are distributed, is preferable to a liquid suspension alone because hydrostatic pressure effects e.g., bulging associated with a high column of liquid suspension can be avoided through use of a film, and the risk of possible leakage can also be avoided. Another advantage of using a plastic film is that, in a plastic film, the particles are generally present only within very small droplets and, hence, do not noticeably agglomerate when the film is repeatedly activated with a voltage.

A "light valve film" as used herein refers to a film having droplets of a liquid suspension of particles distributed in the film or in part of the film.

Light valve films made by cross-linking emulsions are known. See U.S. Pat. Nos. 5,463,491, 5,463,492 and 5,728, 251 and U.S. patent application Ser. No. 08/941,599, all of which are assigned to the assignee of the present invention. All of the above patents and patent applications and any other patents and references cited therein or elsewhere herein are incorporated into this application by reference thereto.

The Liquid Light Valve Suspension

1. Liquid Suspending Media and Stabilizers

A liquid light valve suspension may be any liquid light valve suspension known in the art and may be formulated according to techniques known to one skilled in the art. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension useful in the present invention may include any of the liquid suspending media previously proposed for use in light valves for suspending the particles. Liquid suspending media known in the art which are useful herein, include, but are not limited to the liquid suspending media disclosed in U.S. Pat. Nos. 4,247, 175 and 4,407,565. In general one or both of the liquid suspending medium or the polymeric stabilizer dissolved therein is chosen so as to maintain the suspended particles in gravitational equilibrium.

The polymeric stabilizer, when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose which, in effect, provides a plain surface coating for the particles and one or more additional types of solid polymeric stabilizer that bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

2. Particles

Inorganic and organic particles may be used in a light valve suspension, and such particles may be light-absorbing or light-reflecting in all or part of the visible portion of the electromagnetic spectrum.

Conventional SPD light valves have generally employed polyhalide particles of colloidal size. As used herein the term "colloidal" when referring to particle size shall mean that a particle has a largest dimension averaging 1 micron or less. Preferably, polyhalide or other types of particles used or intended for use in an SPD light valve suspension will have a largest dimension which is less than one-half of the wavelength of blue light i.e., 2000 Angstroms or less to keep light scatter extremely low.

Prior Art Film Adhesion Problems

It has been observed in the prior art that when an SPD film emulsion was placed in between and in direct contact with the indium tin oxide ("ITO") electrodes of two ITO-coated glass or plastic substrates, and then cured with ultraviolet radiation, the cured film exhibited relatively good adhesion to both ITO-coated substrates.

However, in order to permit degassing of the emulsion and volatilization of any trace material either in the emulsion to begin with or formed when the film is cured, it is often preferable to cure the film with one film face uncovered and open to the atmosphere or uncovered and in an inert atmosphere as described in U.S. Pat. No. 5,728,251. In the case of such an SPD film which is cured with one surface uncovered, it has been found that the adhesion of the cured uncovered surface which has cured SPD film thereon to an ITO-coated or other substrate (usually referred to herein as the "applied surface"), is often less good than if the applied surface had been sandwiched and in contact with the uncured SPD film on the ITO-coated substrate prior to and during the curing process. This problem is caused by a tendency of the cured uncovered film surface to form a crust and therefore to lose some of its tackiness, especially if cured for a relatively long time.

Although the aforesaid adhesion problem is discussed above mainly in terms of ITO-coated substrates, it should be understood that a similar problem will arise if an electrode material other than ITO is employed, such as tin oxide, doped tin oxide or a metallic electrode, or if a dielectric material overlays the ITO or other electrode material. Hence, a method for improving the adhesion of the cured uncovered film face to various types of coatings or other surfaces including but not limited to electrodes and dielectric coatings and glass and plastic substrates is needed and would be useful.

DESCRIPTION OF THE INVENTION

It has been found that certain types of adhesive material are highly effective in promoting adhesion between the cured uncovered surface of an SPD film and an applied surface.

Specifically it has been found that adhesives which are inherently tacky at room temperature (about 20° C.), or which become tacky at elevated temperatures are effective in promoting adhesion. In either case, the adhesive material is or becomes tacky while in contact with the applied surface and the cured uncovered surface of an SPD film. Such adhesives are preferably pressure sensitive because they generally will adhere better when pressed against the surface to be adhered to.

There are many adhesives known in the art which are tacky at room temperature, or can become tacky at an elevated temperature. Any such adhesive can be used in the present invention provided that such an adhesive is transparent or sufficiently translucent so that in a thin layer it is nearly transparent and not objectionably hazy, and provided that it is sufficiently tacky to adhere well to an SPD film. For purposes of the present invention, an adhesive will be deemed "sufficiently tacky" if it adheres more strongly to cured SPD film than the cured SPD film adheres to an ITO-coated substrate, i.e., if an applied surface coated with adhesive can remove most of a cured SPD film from its ITO-coated substrate after being pressed together and then peeled apart.

Although hot melt adhesives which become sufficiently tacky are useable in the present invention, it is preferred to use an adhesive which is inherently sufficiently tacky at or about room temperature, because it is generally more convenient not to raise the temperature in order to effect bonding.

An excellent example of such an adhesive which is inherently sufficiently tacky is described below in Example 1.

EXAMPLE 1

1. An adhesive material comprising a nearly colorless viscous acrylic polymer dissolved in toluene called AS-460 HPX, sold by the Adhesives Division of Avery Dennison Corp., located in Flint, Mich. was diluted with acetone so that the AS-460 HPX comprised about 5% of the final solution.

2. The final solution of Step 1 was spread on an ITO-coated PET sheet (the applied surface) in a thickness (before drying) of about 1–2 mils. The volatile solvents were dried off the PET sheet in an oven at 90° C., and the PET sheet was then removed from the oven.

3. Separately, an SPD film was cured with ultraviolet radiation on an ITO-coated glass substrate, as described in the prior art SPD film patent application referred to hereinabove.

4. The AS-460HPX-coated, ITO-coated PET sheet of Step 2 was then sandwiched with the ITO-coated glass substrate of Step 3 (which had a cured SPD film on its ITO), with the SPD film in between the adhesive coated PET sheet and the glass substrate.

5. When peeled apart, most of the SPD film adhered to the adhesive-coated ITO-coated PET sheet, demonstrating that the SPD film bonded more strongly to the AS-460 HPX adhesive than it bonded to the ITO which coated the glass substrate. This is particularly impressive because the SPD film had been cured on the ITO-coated glass substrate.

Although in the above Example adhesive was used on only one substrate atop its electrode, the adhesive could be thus used on both substrates if desired.

The Adhesives Division of Avery Dennison Corp. sells a number of pressure-sensitive adhesives useful for the present invention. A key feature of such polymeric adhesives is that they are inherently tacky when dry. Any adhesive which does not degrade the SPD film and which is transparent or translucent (but nearly transparent in a thin layer) and preferably colorless, and sufficiently inherently tacky when dry, would be useful for the present invention.

A typical but non-limiting patent which describes the pressure-sensitive adhesives made by Avery Dennison Corp. is U.S. Pat. No. 5,895,801 entitled "Pressure-Sensitive Adhesives for Marking Films". (This patent and its disclosure are expressly incorporated herein by reference thereto). This patent claims: An inherently tacky, pressure-sensitive adhesive composition useful for marking films, comprising first and second copolymers formed by sequential emulsion polymerization, wherein (a) the first copolymer is formed from a first monomer mixture comprising: (i) at least one alkyl acrylate containing from 4 to about 12 carbon atoms in the alkyl group; (ii) at least two unsaturated carboxylic acids present in a total amount of from about 3% to about 8% by weight of the first monomer mixture; and (iii) at least one hard monomer other than the at least two unsaturated carboxylic acids; and (b) the second copolymer is formed from a second monomer mixture comprising: (i) at least one alkyl acrylate containing from 4 to about 12 carbon atoms; and (ii) at least one unsaturated carboxylic acid; wherein said first copolymer is present in an amount of at least 50% by weight of the copolymers and has a glass transition temperature from 0 to −25° C., and said second copolymer has a glass transition temperature of less than about −25° C.

The aforesaid claim covers a vast number of possible adhesives. Moreover, the aforesaid adhesives are non-limiting examples of the present invention. Any adhesive which is inherently sufficiently tacky, or becomes sufficiently tacky when heated, and does not significantly degrade SPD film when placed in contact therewith, could be used to increase SPD film adhesion. Although pressure may not be necessarily required, pressure generally enhances bonding of the adhesives of the present invention to virtually any surface and is thus desirable. In order not to interfere significantly with light transmission or reflection from an SPD device incorporating an SPD film comprising such an adhesive, the adhesive should be either transparent, or if translucent, it should appear to be nearly transparent in a thin layer. An adhesive which makes the film appear very hazy, however, should be avoided. Unless color is desired, it is preferable for the adhesive to be colorless.

Because the voltage required to operate an SPD device is a direct function of the distance between the SPD's electrodes, it is desirable to minimize that distance. Therefore it is also desirable for the thickness of the adhesive layer (or layers) to be very small. For the present invention the adhesive layer should preferably be of uniform thickness and its thickness should preferably be less than 1 mil, more preferably less than 0.5 mil, and most preferably less than 0.25 mil.

What is claimed is:

1. In a method for adhering an SPD film to a substrate of a light valve comprising coating either the film or the substrate or both the film and the substrate with an adhesive, placing the film and substrate into contact and adhering the film and the substrate, the improvement wherein the adhesive which is inherently tacky at room temperature or which becomes tacky at an elevated temperature, and wherein said adhesive is or becomes sufficiently tacky such that it adheres more strongly to a cured SPD film than said cured SPD film adheres to said substrate.

2. The method of claim 1, wherein the adhesive becomes tacky when the substrate and the film are in contact with one another.

3. The method of claim 1, wherein the adhesive is a pressure sensitive adhesive.

4. The method of claim 1, wherein the adhesive is transparent or sufficiently translucent so that a thin layer of the adhesive is nearly transparent.

5. The method of claim 1, wherein the adhesive is a hot melt adhesive.

6. The method of claim 1, wherein the adhesive comprises first and second copolymers formed by sequential emulsion polymerization, wherein
   (a) the first copolymer is formed from a first monomer mixture comprising: at least one alkyl acrylate containing from 4 to about 12 carbon atoms in the alkyl group;
      (i) at least two unsaturated carboxylic acids present in a total amount of from about 3% to about 8% by weight of the first monomer mixture; and
      (ii) at least one hard monomer other than the at least two unsaturated carboxylic acids; and
   (b) the second copolymer is formed from a second monomer mixture comprising:
      (i) at least one alkyl acrylate containing from 4 to about 12 carbon atoms; and
      (ii) at least one unsaturated carboxylic acid;
   wherein said first copolymer is present in an amount of at least 50% by weight of the copolymers and has a glass transition temperature from 0 to about −25° C., and said second copolymer has a glass transition temperature of less than about −25° C.

7. The method of claim 1, wherein the adhesive is colorless.

8. A light valve comprising two spaced walls and an SPD film contained between the walls where the walls are formed of a substrate and the film and the substrate are adhered to one another by the method of claim 7.

9. A light valve comprising two spaced walls and an SPD film contained between the walls where the walls are formed of a substrate and the film and the substrate are adhered to one another by the method of claim 2.

10. A light valve comprising two spaced walls and an SPD film contained between the walls where the walls are formed of a substrate and the film and the substrate are adhered to one another by the method of claim 3.

11. A light valve comprising two spaced walls and an SPD film contained between the walls where the walls are formed of a substrate and the film and the substrate are adhered to one another by the method of claim 4.

12. A light valve comprising two spaced walls and an SPD film contained between the walls where the walls are formed of a substrate and the film and the substrate are adhered to one another by the method of claim 5.

13. A light valve comprising two spaced walls and an SPD film contained between the walls where the walls are formed of a substrate and the film and the substrate are adhered to one another by the method of claim 6.

14. A light valve comprising two spaced walls and an SPD film contained between the walls where the walls are formed of a substrate and the film and the substrate are adhered to one another by coating either the film or the substrate or both the film and the substrate with an adhesive, placing the film and the substrate into contact and adhering the film and the substrate, wherein the adhesive is an adhesive which is inherently tacky at room temperature or which becomes tacky at an elevated temperature.

15. In a method for adhering an SPD film to a substrate of a light valve comprising coating either the film or the substrate or both the film and the substrate with an adhesive, placing the film and substrate into contact and adhering the film and the substrate, the improvement wherein the adhesive is an adhesive which is inherently tacky at room temperature or which becomes tacky at an elevated temperature, and wherein the adhesive comprises first and second copolymers formed by sequential emulsion polymerization, wherein (a) the first copolymer is formed from a first monomer mixture comprising:
   (i) at least one alkyl acrylate containing from 4 to about 12 carbon atoms in the alkyl group
   (ii) at least two unsaturated carboxylic acids present in a total amount of from about 3% to about 8% by weight of the first monomer mixture; and
   (iii) at least one hard monomer other than the at least two unsaturated carboxylic acids; and (b) the second copolymer is formed from a second monomer mixture comprising:
   (i) at least one alkyl acrylate containing from 4 to about 12 carbon atoms; and
   (ii) at least one unsaturated carboxylic acid;

wherein said first copolymer is present in an amount of at least 50% by weight of the copolymers and has a glass transition temperature from 0 to about −25° C., and said second copolymer has a glass transition temperature of less than about −25° C.

16. The method of claim 15 wherein the adhesive becomes tacky when the substrate and the film are in contact with one another.

17. The method of claim 15 wherein thee adhesive is a pressure sensitive adhesive.

18. The method of claim 15 wherein the adhesive is transparent or sufficiently translucent so that a thin layer of the adhesive is nearly transparent.

19. The method of claim 15 wherein the adhesive is a hot melt adhesive.

20. A light valve comprising two spaced walls and an SPD film contained between the walls where the walls are formed of a substrate and the film and the substrate are adhered to one another by the method of claim 15.

\* \* \* \* \*